(12) United States Patent
Hsu

(10) Patent No.: US 6,586,857 B2
(45) Date of Patent: Jul. 1, 2003

(54) DEVICE CAPABLE OF INCREASING ROTATION SPEED OF MAGNETO MOTOR

(76) Inventor: Chun-Pu Hsu, No. 19, Wu Chuang Liu Rd., Wu Ku Industrial Park, Taipei Hsien (TW)

( * ) Notice: Subject to any disclaimer, the term of this patent is extended or adjusted under 35 U.S.C. 154(b) by 0 days.

(21) Appl. No.: 09/879,982

(22) Filed: Jun. 14, 2001

(65) Prior Publication Data

US 2003/0001442 A1 Jan. 2, 2003

(51) Int. Cl.⁷ ............................ H02K 11/00; H02K 1/00
(52) U.S. Cl. ............................ 310/156.05; 310/156.06; 310/68 B; 310/68 R; 318/720; 318/721
(58) Field of Search .................... 310/71, 68 R, 310/216, 259, 49 R, 258, 42, 194, 260, 208, 179, 184, 89, 156.05, 156.06, 68 B; 360/99.07, 98.08, 99.12

(56) References Cited

U.S. PATENT DOCUMENTS

| | | | | |
|---|---|---|---|---|
| 3,845,995 A | * | 11/1974 | Wehde | 310/90.5 |
| 3,890,421 A | * | 6/1975 | Habozit | 226/108 |
| 4,329,636 A | * | 5/1982 | Uchida et al. | 318/721 |
| 4,458,184 A | * | 7/1984 | Kawate | 318/254 |
| 4,532,447 A | * | 7/1985 | Cibie | 310/114 |
| 4,694,210 A | * | 9/1987 | Elliott et al. | 310/68 R |
| 4,785,242 A | * | 11/1988 | Vaidya et al. | 324/207.25 |
| 4,818,907 A | * | 4/1989 | Shirotori | 310/67 R |
| 4,837,493 A | * | 6/1989 | Maeno et al. | 318/685 |
| 4,857,784 A | * | 8/1989 | Mukaekubo | 310/68 B |
| 5,028,073 A | * | 7/1991 | Harms et al. | 280/5.501 |
| RE36,168 E | * | 3/1999 | von der Heide et al. | 310/67 R |
| 5,879,785 A | * | 3/1999 | Shin | 428/209 |
| 6,111,390 A | * | 8/2000 | Inaba et al. | 322/28 |
| 6,127,760 A | * | 10/2000 | Nagasaki et al. | 310/254 |
| 6,160,384 A | * | 12/2000 | Inaba et al. | 322/59 |

\* cited by examiner

Primary Examiner—Dang Dinh Le
Assistant Examiner—H. Y. M. Elkassabgi
(74) Attorney, Agent, or Firm—Rosenberg, Klein & Lee

(57) ABSTRACT

A plurality of magnetic sensors are provided in a magneto motor to sense variations of rotating poles of rotor magnets. One of the magnetic sensors is provided to let the exciting current of stator coils and the rotating poles of the rotor interchange orthogonally, and the others are provided to let the exciting current of the stator coils and the rotating poles of the rotor interchange non-orthogonally. The magnetic sensor letting the stator coils and the rotor magnets orthogonally excite each other will let the magnetic flux density of the armature gap be highest, and the others letting the stator coils and the rotor magnets non-orthogonally excite each other will generate an effect similar to weak magnetic control.

7 Claims, 4 Drawing Sheets

DEVICE CAPABLE OF INCREASING ROTATION SPEED OF MAGNETO MOTOR

FIELD OF THE INVENTION

The present invention relates to a device capable of increasing the rotation speed of a magneto motor and, more particularly, to a plurality of magnetic sensors provided in a magneto motor to sense rotor magnets and let the exciting current of stator coils generate variable conduction angles.

BACKGROUND OF THE INVENTION

To manufacture an electromotor of high operational efficiency, an appropriate value of the torsion coefficient $K_T$ must be designed and matched with the operational range of the electromotor, as illustrated with the following formulas.

$$E = K_E \cdot \Omega \qquad K_E = B \cdot D \cdot L \cdot Z/2$$
$$T = K_T \cdot I_a \qquad K_T = B \cdot D \cdot L \cdot Z/2$$

wherein E is the counter electromotive force voltage (volt), T is the output torsion (N–m), $K_E$ is the counter electromotive force coefficient, $K_T$ is the torsion coefficient, $\Omega$ is the rotation speed of the armature (rad/sec), $I_a$ is the armature current (ampere), B is the magnetic flux density of the gap (gauss), D is the outer diameter of the armature (cm), L is the superimposed thickness (cm), and Z is the total number of turns of conductors.

As can be seen from the above formulas, the counter electromotive force coefficient $K_E$ equals the torsion coefficient $K_T$, and the counter electromotive force coefficient $K_E$ is inversely proportional to the rotation speed of the armature $\Omega$. Therefore, for a fixed counter electromotive force voltage E, if the normal rated rotation speed of the armature is lower, the value of the counter electromotive force coefficient $K_E$ will be relatively higher, while if the normal rated rotation speed of the armature is higher, the value of the counter electromotive force coefficient $K_E$ will be relatively lower. If a motor is designed to have a higher normal rated rotation speed of the armature, the value of the torsion coefficient $K_T$ will be relatively lower so that the torsion T ($T=K_T \cdot I_a$) can only be increased with a higher armature current $I_a$ if the motor is operated at a lower rotation speed. If a motor is designed to have a higher torsion coefficient $K_T$, the motor will not accomplish a higher normal rated rotation speed because $K_T=K_E$ and $E=K_E \cdot \Omega$. The present invention can let a motor have a higher torsion coefficient $K_T$. Moreover, the present invention can switch to magnetic sensors sensing angle in advance to let the armature of the motor generate the effect of weak magnetic control, hence reducing the magnetic flux density of the armature gap. From the above formulas $K_E=B \cdot D \cdot L \cdot Z/2$ and $E=K_E \cdot \Omega$, because the magnetic flux density B of the armature gap decreases, the counter electromotive force coefficient $K_E$ consequentially decreases. Therefore, the rotation speed of the armature, $\Omega$, will inevitably increase.

The torsion coefficient $K_T$ of a prior art motor is a single value. For a motor usually operating in the range of lower rotation speeds and sometimes operating in the range of higher rotation speeds (e.g., a light electric vehicle), to let the motor operate in the seldom work range of the highest rotation speed when necessary, because $K_E=K_T$, $E=K_E \cdot \Omega$, and $T=K_T \cdot I_a$, the torsion coefficient $K_T$ and the counter electromotive force coefficient $K_E$ must decrease to increase the rotation speed $\Omega$ to the seldom work range of the highest rotation speed if the counter electromotive force voltage E is fixed. Because the torsion coefficient $K_T$ decreases, and the motor usually operates in the range of lower rotation speeds, the armature current $I_a$ must increase to increase the torsion T because $T=K_T \cdot I_a$. However, a too large $I_a$ is not good to the operational efficiency of the motor. This can be known from the following formula.

$$P = I^2 \cdot R$$

wherein P is the dissipated power of the coil of an electromotor, I is the armature current, and R is the impedance of the coil. Therefore, if the torsion of a motor is increased by increasing the armature current, the dissipated power of the stator coil will increase squarely, and heat will be generated in the impedance of the coil. The impedance of the coil will correspondingly rise due to the temperature rise of the metallic coil. This vicious circle will let the motor operate in an environment of high temperature, hence resulting in a worse output efficiency.

SUMMARY OF THE INVENTION

A stator portion of a conventional motor is formed by winding a single coil. Therefore, the torsion coefficient $K_T$ and the counter electromotive force coefficient $K_E$ thereof are consequentially constant values. If a motor is designed to have higher values of the $K_T$ and $K_E$, the rotation speed $\Omega$ of the armature will decrease proportionally. In the present invention, a plurality of magnetic sensors are provided in a magneto motor to sense the variation of rotating poles of rotor magnets, and at least a magnetic sensor is provided at the position letting the switching angle of the exciting current of stator coils be not orthogonal to the rotating poles of the rotor. Signals sensed by the non-orthogonal switching sensors are outputted to a motor driving and control circuit, which let the exciting current of the stator coils of the motor generate the effect of weak magnetic control, hence increasing the rotation speed of the rotor. The above weak magnetic control device capable of increasing the rotation speed of a motor when necessary can let the motor use magnetic sensors which switch angles with normal exciting current to have a larger value of the torsion coefficient $K_T$. When a motor of larger $K_T$ value operates at lower rotation speeds, because the armature current $I_a$ can be decreased proportionally ($T=K_T \cdot I_a$), the dissipated power of the stator coils of the motor will also decrease ($P=I^2 \cdot R$), thereby reducing the working temperature of the motor and increasing the operational efficiency of the motor operating at lower rotation speeds.

The various objects and advantages of the present invention will be more readily understood from the following detailed description when read in conjunction with the appended drawing, in which:

DETAILED DESCRIPTION OF THE PREFERRED EMBODIMENTS

Figure 1:
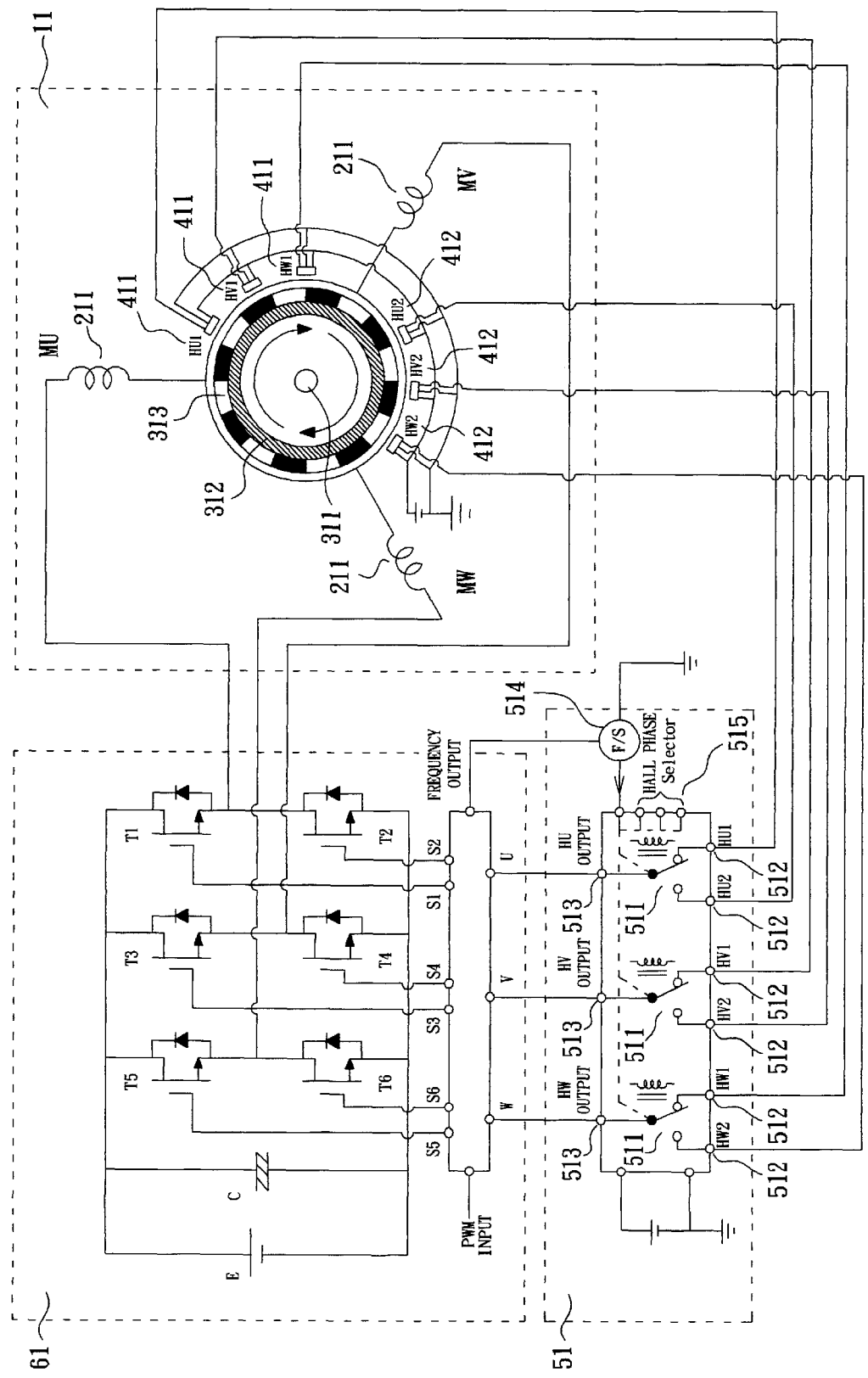
FIG. 1 is a diagram showing the circuit connection according to an embodiment of the present invention.
Figure 2:
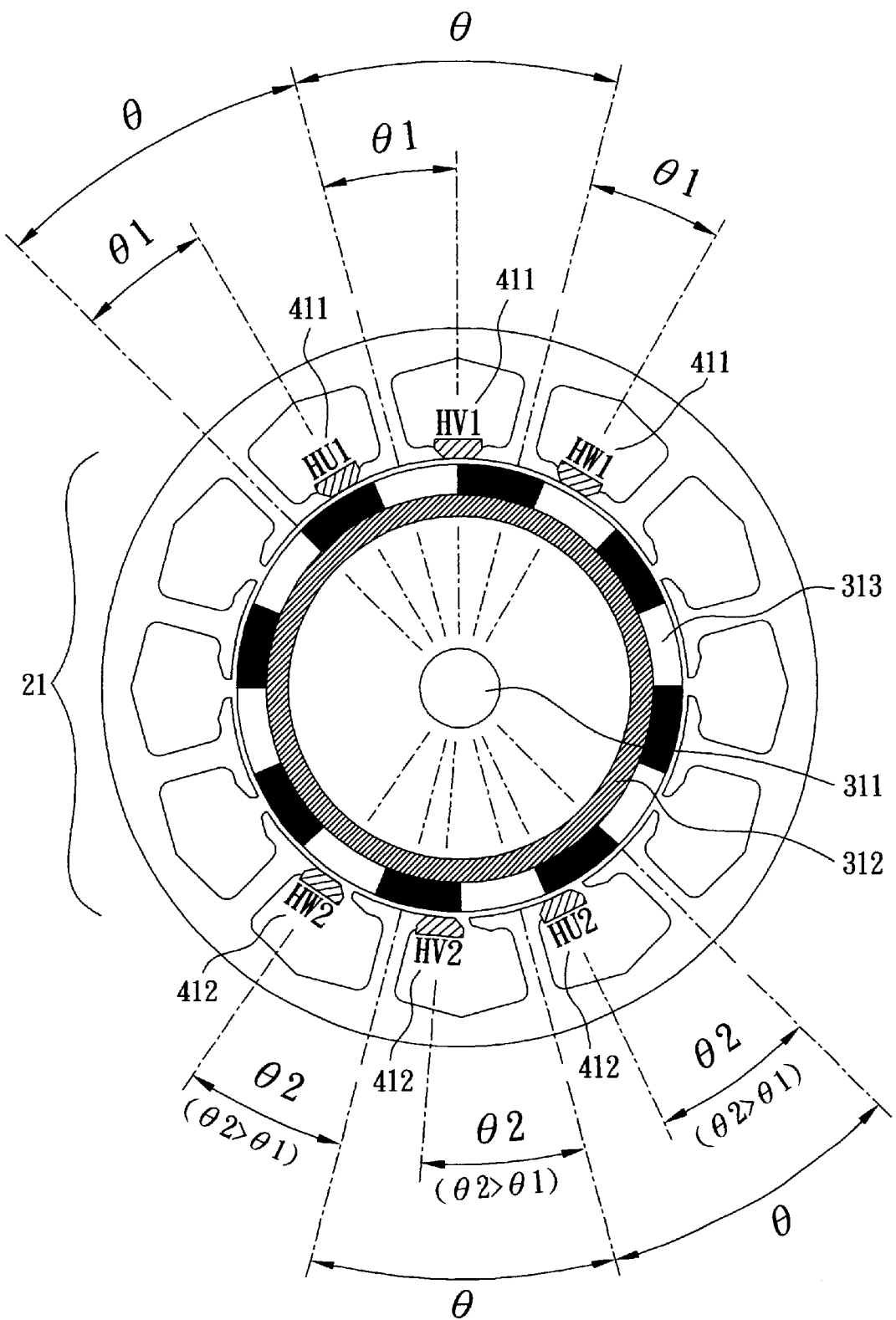
FIG. 2 is a diagram showing positions and angles of a rotor portion, a stator portion, and a plurality of magnetic sensors according to an embodiment of the present invention.
Figure 3A:
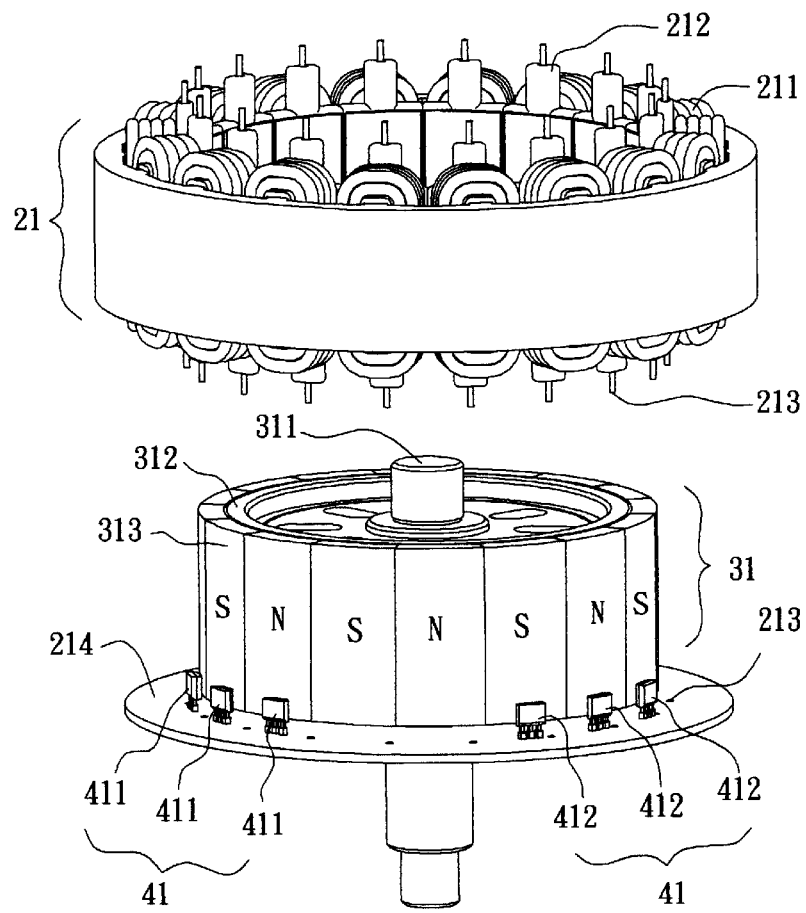
FIGS. 3A and B are perspective views showing positions and angles of an inner rotor portion, an outer stator portion, and a plurality of magnetic sensors according to an embodiment of the present invention.
Figure 3B:
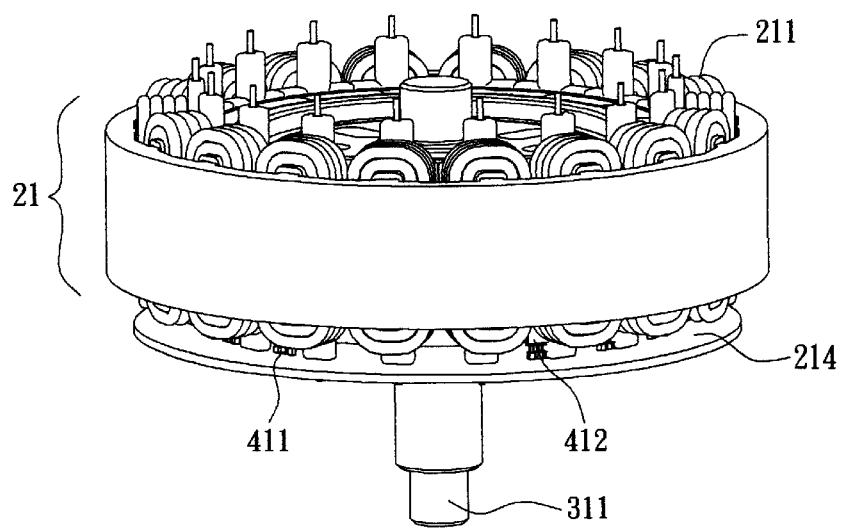
Figure 4A:
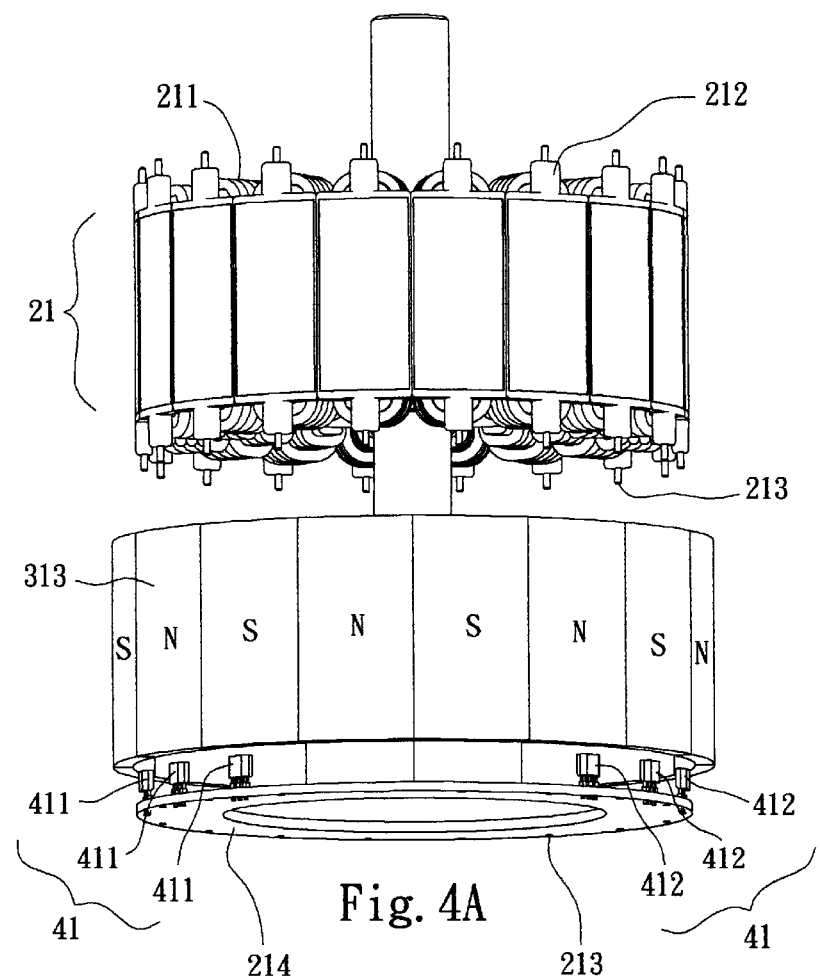
FIGS. 4A and B are perspective views showing positions and angles of an outer rotor portion, an inner stator portion.
Figure 4B:
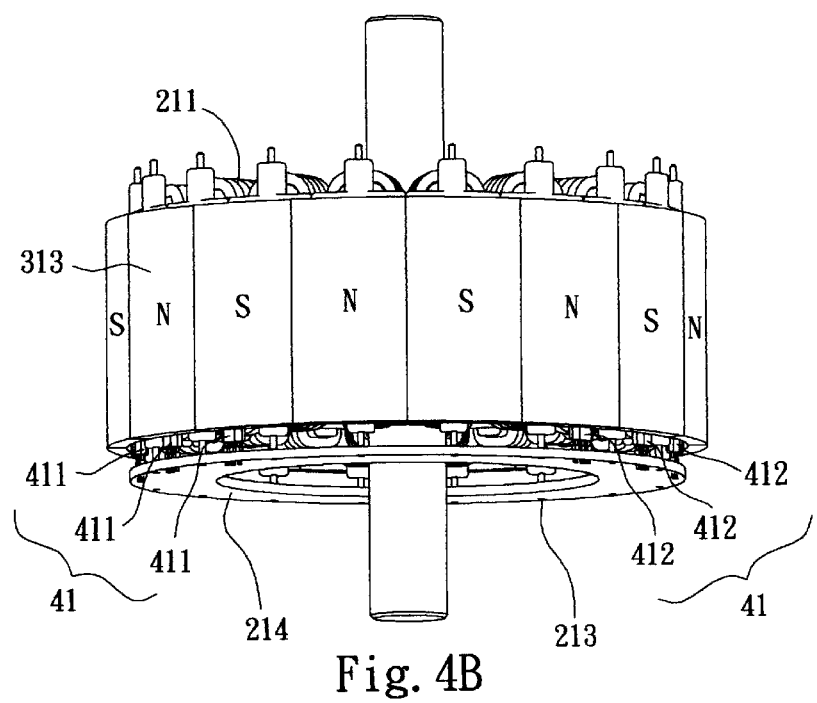

As shown in FIGS. 1 to 4, the present invention provides a device capable of increasing the rotation speed of a magneto motor. The device comprises a magneto motor 11, a plurality of magnetic sensors 41, and a magnetic sensing signal selection circuit 51.

The magneto motor 11 comprises a stator portion 21 and a magneto rotor portion 31 therein. The stator portion 21 is provided to let stator coil windings 211 be disposed in stator wire grooves 212. The wire grooves 212 also provide a positioning device 213 to fix and position a magnetic sensor circuit board 214. The magneto rotor portion 31 is provided to let a pivot 311, a magnetic conduction iron yoke 312, and a tube magnet 313 be concentrically joined to form a rotating rotor 31. The tube magnet 313 corresponds to an exciting coil of the stator so that an armature can react to rotate.

The plurality of magnetic sensors 41 correspond to the rotor magnets 313 to sense a plurality of magnetic sensing signals, which let the stator coils 211 correspond to the variations of rotating poles of the rotor magnets 313 to obtain magnetic sensors 411 and 412 of various kinds of switching angles of exciting current. The plurality of magnetic sensors 41 are positioned on the magnetic sensor circuit board 214.

The magnetic sensing signal selection circuit 51 is a circuit selecting the sensing signal of one of the plurality of magnetic sensors 41 through instructions of a control terminal 515. The sensing signals of the plurality of magnetic sensors 41 are all inputted to input terminals 512 of a switch 511. An output terminal 513 of the switch 511 is provided to output the signal of one of the plurality of magnetic sensors. The outputted signal is transferred to a motor driving and control circuit 61 to let the stator coils 211 and the rotor magnets 313 generate armature reaction.

The switch 511 can be a relay with contacts. The switch 51 is switched and controlled by the magnetic sensing signal selection circuit 51 to only output the sensing signal of one of the plurality of magnetic sensors 41.

The switch 511 can also be an electronic semiconductor without contacts. The switch 51 is switched and controlled by the magnetic sensing signal selection circuit 51 to only output the sensing signal of one of the plurality of magnetic sensors 41.

The selection of output signals of the plurality of magnetic sensors 41 can be accomplished by referring to the level of the rotation speed of the motor to generate a switching control signal, which is inputted to the control terminal 515 of the magnetic sensing signal selection circuit 51. The magnetic sensing signal selection circuit 51 then will automatically switch the switch 511 according to the level of the rotation speed of the motor.

The selection of output signals of the plurality of magnetic sensors 41 can also be accomplished manually to input the switching and control signal to the control terminal 515 of the magnetic sensing signal selection circuit 51. The magnetic sensing signal selection circuit 51 then will automatically switch the switch 511 according to the manually switched control signal.

The stator portion 21 can be an outer stator portion, and the rotor portion 31 is a magneto inner rotor portion, i.e., a magneto inner rotor type motor.

The stator portion 21 can also be an inner stator portion, and the rotor portion 31 is a magneto outer rotor portion, i.e., a magneto outer rotor type motor.

One of the magnetic sensors 41 is positioned near the central angle position θ1 411 of adjacent stator teeth. The magnetic sensor at this position senses the variation of rotating poles of the rotor magnets 313 to let the switching angle of the exciting current of the stator coils 211 and the rotating poles of the rotor magnets 313 interchange orthogonally, thereby letting the magnetic flux density of the armature gap be highest. Additionally, at least a magnetic sensor 41 is positioned at a non-central angle position θ2 412 of adjacent stator teeth. The magnetic sensor at this position senses the variation of rotating poles of the rotor magnets 313 to let the switching angle of the exciting current of the stator coils 211 and the rotating poles of the rotor magnets 313 interchange non-orthogonally, thereby letting the correspondingly flowing magnetic flux density of the armature gap be reduced.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A device capable of increasing the rotation speed of a magneto motor, comprising:

a magneto motor including a stator portion and a rotor portion, said stator portion having stator coil windings disposed in stator wire grooves, said wire grooves also providing a positioning device to fix and position a magnetic sensor circuit board, said rotor portion being a rotating rotor formed by a pivot, a magnetic conduction iron yoke, and a tubular arrangement of rotor magnets concentrically joined together, said tube magnet corresponding to an exciting coil of the stator portion to generate armature reaction;

a plurality of magnetic sensors positioned on said magnetic sensor circuit board in respective correspondence to said rotor magnets to sense a plurality of magnetic sensing signals and output respective sensing signals, which let said stator coils correspond to variations of rotating poles of said rotor magnets; and a magnetic sensing signal selection circuit for selecting at least one of said sensing signals from said magnetic sensors through instructions of a control terminal thereof, the sensing signals of said magnetic sensors all being input to input terminals of a switch, an output terminal of said switch being provided to output the sensing signal of one of said magnetic sensors, the sensing signal output being transferred to a motor driving and control circuit to adjust a switching angle of excitation current of said stator coils for generating an armature reaction, a first of said plurality of magnetic sensors being positioned near a central angle position of adjacent stator teeth, said first magnetic sensor sensing the variations of rotating poles of said rotor magnets to adjust said switching angle of the excitation current of said stator coils for generating an orthogonal interaction between magnetic fields of said rotor portion and said stator portion and thereby maximizing a magnetic flux density in a gap between said rotor portion and said stator portion, at least a second of said plurality of magnetic sensors being positioned at a non-central angle position of said adjacent stator teeth, said second of said plurality of magnetic sensors sensing the variation of rotating poles of said rotor magnets to adjust said switching angle of the excitation current of said stator coils for generating a non-orthogonally interaction between magnetic fields of said rotor portion and said stator portion and thereby reduce said magnetic flux density in the gap between said rotor portion and said stator portion from said maximum.

2. The device capable of increasing the rotation speed of a magneto motor as claimed in claim 1, wherein said switch can be a relay with contacts, and said switch is switched and controlled by said magnetic sensing signal selection circuit to only output the sensing signal of one of said magnetic sensors.

3. The device capable of increasing the rotation speed of a magneto motor as claimed in claim 1, wherein said switch can be an electronic semiconductor without contacts, and said switch is switched and controlled by said magnetic sensing signal selection circuit to only output the sensing signal of one of said magnetic sensors.

4. The device capable of increasing the rotation speed of a magneto motor as claimed in claim 1, wherein said stator portion is an outer stator portion, and said rotor portion is a magneto inner rotor portion.

5. The device capable of increasing the rotation speed of a magneto motor as claimed in claim 1, wherein said stator portion is an inner stator portion, and said rotor portion is a magneto outer rotor portion.

6. A device capable of increasing the rotation speed of a magneto motor, comprising:

a magneto motor including a stator portion and a rotor portion, said stator portion having stator coil windings disposed in stator wire grooves, said wire grooves also providing a positioning device to fix and position a magnetic sensor circuit board, said rotor portion being a rotating rotor formed by a pivot, a magnetic conduction iron yoke, and a tubular arrangement of rotor magnets concentrically joined together, said rotor magnets being in respective correspondence to excited stator coils of the stator portion to generate an armature reaction;

a plurality of magnetic sensors positioned on said magnetic sensor circuit board in respective correspondence to said rotor magnets to sense a plurality of magnetic sensing signals and output of a sensing signal responsive thereto; and a magnetic sensing signal selection circuit for selecting at least one of said sensing signals from said magnetic sensors responsive to a switching control signal input to a control terminal thereof, said magnetic sensing signal selection circuit including a switching circuit, the sensing signals of said magnetic sensors each being input to a respective input terminal of said switching circuit, an output terminal of said switching circuit providing an output of the signal of one of said magnetic sensors, the output signal being transferred to a motor driving and control circuit to adjust a switching angle of excitation current of said stator coils, the selection of said sensing signals of said plurality of magnetic sensors being responsive to a level of a rotational speed of said motor to generate said switching control signal input to said control terminal of said magnetic sensing signal selection circuit, and said magnetic sensing signal selection circuit then automatically switching said switching circuit according to the level of the rotational speed of said magneto motor.

7. A device capable of increasing the rotation speed of a magneto motor, comprising:

a magneto motor including a stator portion and a rotor portion, said stator portion having stator coil windings disposed in stator wire grooves, said wire grooves also providing a positioning device to fix and position a magnetic sensor circuit board, said rotor portion being a rotating rotor formed by a pivot, a magnetic conduction iron yoke, and a tubular arrangement of rotor magnets concentrically joined together, said rotor magnets being in respective correspondence to excited stator coils of the stator portion to generate an armature reaction;

a plurality of magnetic sensors positioned on said magnetic sensor circuit board in respective correspondence to said rotor magnets to sense a plurality of magnetic sensing signals and output of a sensing signal responsive thereto; and a magnetic sensing signal selection circuit for selecting at least one of said sensing signals from said magnetic sensors responsive to a switching control signal input to a control terminal thereof, said magnetic sensing signal selection circuit including a switching circuit, the sensing signals of said magnetic sensors each being input to a respective input terminal of said switching circuit, an output terminal of said switching circuit providing an output of the signal of one of said magnetic sensors, the output signal being transferred to a motor driving and control circuit to adjust a switching angle of excitation current of said stator coils, the selection of said sensing signals of said plurality of magnetic sensors being responsive to a manual input the switching and control signal to said control terminal of said magnetic sensing signal selection circuit, and said magnetic sensing signal selection circuit then automatically switching said switching circuit according to the manually switched control signal.

* * * * *